United States Patent [19]
Tong et al.

[11] Patent Number: 6,020,018
[45] Date of Patent: *Feb. 1, 2000

[54] INHIBITION OF ENZYMATIC BROWNING OF RAW FRUIT AND/OR VEGETABLE JUICE

[75] Inventors: Cindy B. S. Tong, Lauderdale, Minn.; Kevin B. Hicks, Glenside, Pa.

[73] Assignee: The United States of America, as represented by the Secretary of Agriculture, Washington, D.C.

[ * ] Notice: This patent is subject to a terminal disclaimer.

[21] Appl. No.: 08/068,040

[22] Filed: May 28, 1993

Related U.S. Application Data

[63] Continuation-in-part of application No. 07/749,347, Aug. 31, 1991, Pat. No. 5,244,684.

[51] Int. Cl.[7] ....................................................... A23L 2/02
[52] U.S. Cl. .......................... 426/599; 426/330.5; 426/269
[58] Field of Search ................................. 426/330.5, 269, 426/599, 268

[56] References Cited

U.S. PATENT DOCUMENTS

| | | | |
|---|---|---|---|
| 2,380,036 | 7/1945 | Flosdorf | 426/330.5 |
| 4,101,678 | 7/1978 | Baker | 426/330.5 |
| 4,163,807 | 8/1979 | Jackson | 426/330.5 |
| 4,293,580 | 10/1981 | Rubenstein | 426/599 |
| 4,478,855 | 10/1984 | Dahlen | 426/599 |
| 4,609,561 | 9/1986 | Wade | 426/599 |
| 4,816,283 | 3/1989 | Wade | 426/599 |
| 4,828,866 | 5/1989 | Wade | 426/599 |
| 4,830,868 | 5/1989 | Wade | 426/599 |
| 4,834,990 | 5/1989 | Amer | 426/599 |
| 4,925,686 | 5/1990 | Kastin | 426/599 |
| 4,935,258 | 6/1990 | Wade | 426/599 |
| 4,959,230 | 9/1990 | Wyss | 426/302 |
| 4,965,083 | 10/1990 | Norman | 426/330.5 |
| 4,975,293 | 12/1990 | Hicks | 426/330.5 |
| 5,055,313 | 10/1991 | Warren | 268/268 |
| 5,244,684 | 9/1993 | Tong | 426/599 |

FOREIGN PATENT DOCUMENTS

| | | | |
|---|---|---|---|
| 59-55174 | 3/1984 | Japan | 426/599 |
| 2-27954 | 1/1990 | Japan | 426/599 |
| 275710 | 7/1988 | United Kingdom | 426/269 |

OTHER PUBLICATIONS

Whistler (1973) Industrial Gums, 2nd Edition, Academic Press, New York. pp. 83–85, 401.
Furia (1972) CRC Handbook of Food Additives, Second Edition, vol. I pp. 334–335.

*Primary Examiner*—Carolyn Paden
*Attorney, Agent, or Firm*—M. Howard Silverstein; John D. Fado; Gail E. Poulos

[57] ABSTRACT

The present invention is drawn to inhibiting browning of raw fruit juice and/or raw vegetable juice. The juice is treated with at least one sulfated polysaccharide in an amount sufficient to inhibit browning. A promoter may also be present, which promoter is selected from the group consisting of chelating agents, acidulents, or mixtures thereof.

12 Claims, 3 Drawing Sheets

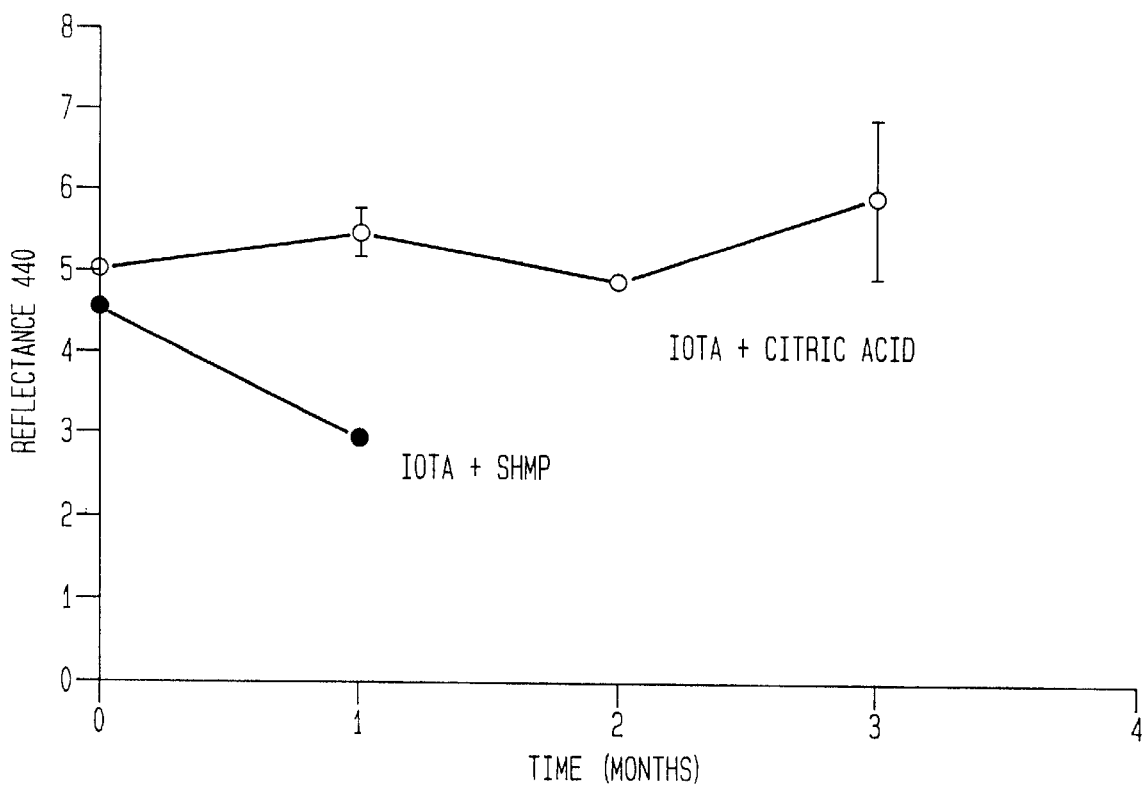

INHIBITION OF ENZYMATIC BROWNING OF RAW FRUIT AND/OR VEGETABLE JUICE

This is a continuation of application Ser. No. 07/749,347, filed Aug. 31, 1991 now U.S. Pat. No. 5,244,684.

FIELD OF THE INVENTION

The present invention relates to the inhibition of enzymatic browning of raw fruit juice and/or raw vegetable juice by treating said juice with an effective anti-browning amount of at least one sulfated polysaccharide to inhibit browning. A promoter selected from the group consisting of chelating agents, acidulents and mixtures thereof, may also be used in combination with the at least one sulfated polysaccharide to enhance the anti-browning effect thereof.

BACKGROUND OF THE INVENTION

When raw fruit and vegetables are subjected to mechanical injury, e.g., peeling, cutting, slicing, crushing, etc., enzymatic browning usually occurs. This enzymatic browning results from the polyphenol oxidase—catalyzed oxidation of phenolic compounds to O-quinones, which polymerize to form dark-colored pigments. This discoloration of fruit and vegetable products presents a serious problem in the food industry. Such products deteriorate in both taste and appearance and are thus not appealing to consumers. Consequently, a significant amount of fruit and vegetable product must be either drastically reduced in price or discarded. This results in a substantial financial loss to the food industry.

Sulfites were used in the food industry for some time to inhibit enzymatic browning in cut fruit and vegetables, as well as in juices. However, it was discovered that sulfites are a significant health threat to people with certain ailments, such as asthma. Consequently, the use of sulfites in fresh food products such as fruits and vegetables, and their juices, was banned. Because of this ban, much effort is being expended to find acceptable and economical substitutes for sulfites. Currently, the alternatives to sulfites for use in fresh cut fruit and vegetables include additive blends of ascorbic or erythorbic acid, food-grade phosphates, citric acid, dextrose, sodium or calcium chloride, or cysteine and potassium sorbate. See "Sulfite Alternative Blend Extends Fruit, Vegetable Freshness"; Duxbury, Dean D., *Food Processing*, November 1986, pp. 64 & 66. While such alternatives show promise, they do not penetrate plant tissue as readily as sulfites do and can be oxidized over time. Thus, their effects are less than, or do not last as long as, that of sulfites.

It has also been reported that ascorbic acid derivatives such as ascorbic acid-2-phosphate and ascorbyl-6-palmitate, can be used either alone, or in combination with an acidic polyphosphate, to inhibit the browning of mechanically injured raw fruit and vegetable products. See U.S. Pat. No. 4,814,192. Further, it is taught in U.S. Pat. No. 4,975,293 that soluble cyclodextrins, either alone or in combination with an acidic polyphosphate, can also be used to inhibit browning. While these alternatives show promise, the acidic polyphosphate and cyclodextrin are not yet approved for food use.

U.S. Pat. No. 4,959,230 teaches the use of an edible thixotropic gum, which may be a carrageenan, and an edible organic acid for inhibiting deterioration and extending the shelf life of fresh fruits and vegetables. There is no suggestion of the treatment of juices. The fact that specific chemical agents can be used for inhibiting, deterioration of freshly cut fruit and vegetables does not necessarily mean that the same agents can be used to inhibit deterioration of juice from the same fruit and vegetables. For example, ascorbic acid-2-phosphate and -triphosphate showed promise for inhibiting browning of cut surfaces of various fruit and vegetables, but were ineffective for juice. Also, while cinnamate and benzoate inhibited browning in juice, they induced browning when applied to cut surfaces. Further, combinations of -cyclodextrin with ascorbic acid, ascorbic acid-2-phosphate, or ascorbyl palmitate, were effective in juice but not on cut surfaces. Combinations of ascorbic acid with an acidic polyphosphate were highly effective with both juice and cut surfaces. See, "Control of Enzymatic Browning in Apple with Ascorbic Acid Derivatives, Polyphenol Oxidase Inhibitors and Complexing Agents"; by G. M. Sapers et al.; *Journal of Food Science;* 1989; pp. 997–1002 & 1012. Thus it can be appreciated that one cannot predict with any certainty an agent's anti-browning properties for juice, given its effect on freshly cut fruits and vegetables, and vice versa.

While various chemical agents have been developed as sulfite substitutes for the inhibition of browning of cut fruit and vegetables, as well as for juices, there still remains a need in the art for more effective substitutes for sulfites. This is especially true for those agents which have already been approved for food use, not only on fresh fruit and vegetables, but also for use in juices.

SUMMARY OF THE INVENTION

In accordance with the present invention, there is provided a process of preserving raw fruit juice and/or raw vegetable juice by inhibiting the enzymatic browning of these juices. The present invention involves treating the raw fruit juice and/or raw vegetable juice with at least one sulfated polysaccharide, with or without a promoter, in a concentration which is sufficient to inhibit browning. The promoter is selected from the group consisting of chelating agents, acidulents and mixtures thereof, which will enhance the browning inhibiting properties of the at least one sulfated polysaccharide. The treatments are safe and offer suitable alternatives to the use of potentially toxic sulfite treatments to preserve such raw juices.

Accordingly, it is an object of the present invention to provide a novel process for preserving raw fruit juice and/or raw vegetable juice.

Further, it is an object of the invention to provide novel browning inhibiting compositions useful to inhibit enzymatic browning in raw fruit juice and/or raw vegetable juice without the use of sulfites.

It is also an object of the present invention to provide raw fruit juice and/or raw vegetable juices containing an effective amount of the browning inhibiting compositions.

In a preferred embodiment of the present invention, an effective amount of at least one chelating agent is used, as the promoter, to enhance the browning inhibitor effectiveness of the at least one sulfated polysaccharide.

In another preferred embodiment of the present invention, an effective amount of at least one acidulent and at least one chelating agent are used, as the promoter, in combination with the at least one sulfated polysaccharide.

In still other preferred embodiments of the present invention, the juice contains: from about 0.1% to about 5% of at least one sulfated polysaccharide; or from about 0.025% to about 1% of at least one sulfated polysaccharide in combination with about 0.25% to about 1% of the promoter, preferably citric acid.

BRIEF DESCRIPTION OF THE FIGURES

FIG. 3 is a graph of reflectance at 440 nm vs. time (in months) of two samples of raw apple juice, both containing 0.1% iota-carrageenan and 0.1% sodium benzoate, showing the results obtained by Example 4. One sample also contained 0.5% citric acid and the other contained 0.5 % sodium hexametaphosphate (SHMP). The samples were stored from 1 to 3 months at 3° C. Data shown are means of 3 replicates ±95% confidence interval.

DETAILED DESCRIPTION OF THE INVENTION

Figure 1:
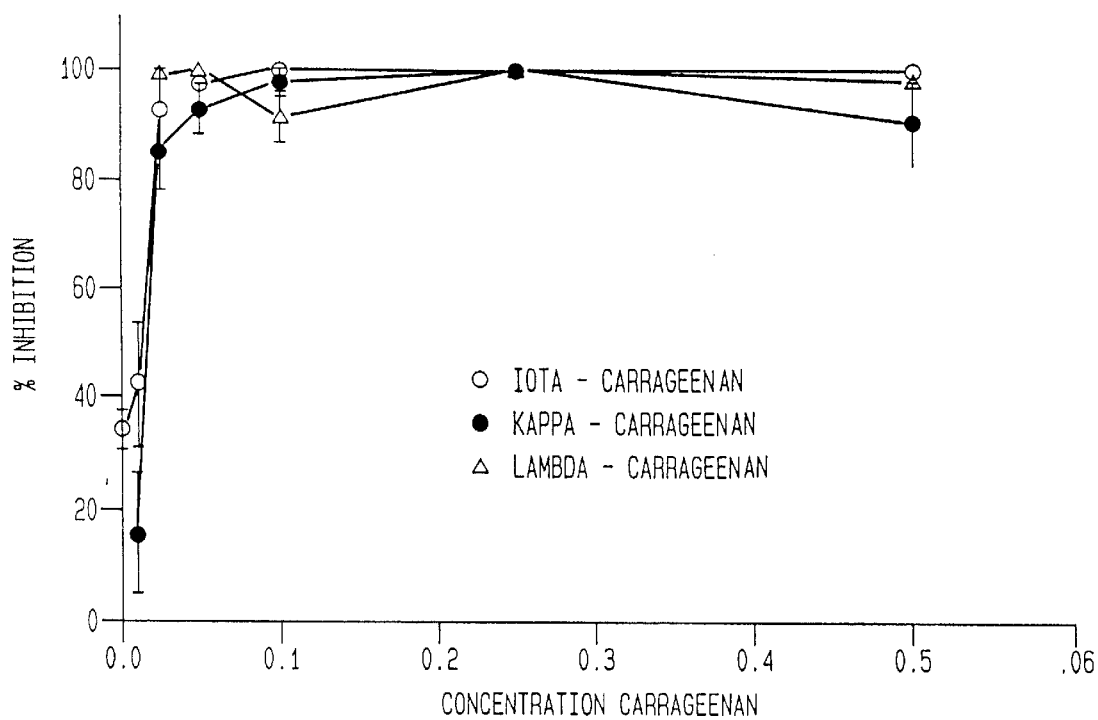
FIG. 1 is a graph of percent inhibition vs. concentration of carrageenan, showing dose response curves for the inhibition of browning of raw apple juice by iota-, kappa-, and lambda-carrageenan, in the presence of 0.5% citric acid (means of 6 or more replicates ±95% confidence interval), as described in Example 3.

Any suitable sulfated polysaccharide can be used in the practice of the present invention to inhibit browning in raw fruit juice and/or raw vegetable juice. Suitable sulfated polysaccharides include the carrageenans, amylose sulfate, xylan sulfate and mixtures of the aforementioned. Preferred are the carrageenans, such as iota-carrageenan, kappa-carrageenan, lambda-carrageenan and mixtures thereof. When used alone, the concentration of the at least one sulfated polysaccharide will range from about 0.1% to about 5%, preferably from about 0.25% to 1%, more preferably from about 0.3% to 0.5%. When the sulfated polysaccharide is iota or kappa carrageenan, then it is preferred that no more than 1% be used. If the sulfated polysaccharide(s) is used with a promoter (i.e. a chelating agent, acidulant or mixture thereof) then the polysaccharide(s) can be present in an amount as low as 0.025%, i.e. in a range of from about 0.025% to about 5%. For example where the polysaccharide is at least one carrageenan selected from the group consisting of lambda-carrageenan, iota-carrageenan, kappa-carrageenan and mixtures thereof, it may be combined with the juice in an amount of from about 0.025% to about 1%, with from about 0.25% to about 1% of at least one chelating agent, and from about 0.1% to about 1% of at least one acidulant. It is to be understood that all percents of ingredients throughout this specification are based on the weight of ingredient per volume of juice (unless otherwise indicated). That is, weight (grams) per volume (100 ml of juice). For example, 0.5% can be taken to mean 5 mg of ingredient per ml of juice, or 0.5 gram of ingredient per 100 ml of juice.

The promoter of the present invention is selected from the group consisting of chelating agents, acidulants or mixtures thereof. Chelating agents suitable for use in the practice of the present invention are those which can chelate, or complex, with the essential metal cations of the polyphenol oxidase enzyme of the juice. Non-limiting examples of chelating agents suitable for use herein include citric acid, acid polyphosphates (such as Sporix or sodium hexametaphosphate (SHMP)) and mixtures thereof. The amount of chelating agent used will be an effective amount. That is, from the minimum amount which will promote the antibrowning activity, or effectiveness, of the at least one sulfated polysaccharide, to that amount which will produce undesirable characteristics in the juice. Of course, for economical reasons, only the minimum amount needed to obtain the desired promotion should be used. In general, the amount of chelating agent used will range from about 0.25% to about 1%, preferably from about 0.4% to about 0.6%.

The term "acidulent", as used herein, is used to designate any additive, preferably a food-grade additive, which serves to lower the pH of the juice below the optimal pH value for polyphenol oxidase activity. Non-limiting examples of acidulents which can be used in the practice of the present invention include citric acid, gluconic acid, lactic acid, ascorbic acid, and the like, and mixtures of the foregoing. The amount of acidulent(s) used should also be an effective amount. That is, that minimum amount which will promote, or enhance, the antibrowning activity of the at least one sulfated polysaccharide and optionally the chelating agent, up to that amount which will produce undesirable characteristics in the juice. This amount will typically range from about 0.25% to about 1%, preferably from about 0.4% to about 0.6%. It is particularly preferred that the same component act as both the chelating agent and the acidulent. Citric acid is such a component.

Although an aqueous concentrate can be used to deliver the antibrowning compositions of the present invention to the juice, it is preferred to add them directly to the juice in dry, or powder, form. This will eliminate any concerns about diluting the juice. For optimum results, the compounds used herein should be in substantially pure form, that is, free of undesirable contaminants that tend to mask or otherwise inhibit their effectiveness as browning inhibitors. The antibrowning compositions of the present invention are comprised of the aforementioned at least one sulfated polysaccharide and promoter. In one embodiment of the instant invention, the composition includes at least one carrageenan in combination with the promoter in a weight ratio of from about 0.025 to 1, to about 1 to 0.25, optionally in the form of an aqueous concentrate.

The present invention is useful in preserving the storage life of raw fruit juice and/or raw vegetable juice which undergo enzymatic browning, i.e., polyphenol oxidase-oxidation of polyphenols. Consequently, the present invention is useful in preserving the juices of a variety of raw fruits and vegetables including, but not limited to, apples, grapes, or mixtures thereof, and the like.

The present invention is further demonstrated by the following examples which are intended only to further illustrate the invention and not to limit the scope of the invention as defined by the claims.

EXAMPLE 1

The effectiveness of various sulfated polysaccharides, with and without the addition of 0.5% citric acid, or 0.5% sodium hexametaphosphate were evaluated for the inhibition of browning of fresh, raw, 'Granny Smith' apple juice. The ingredients used, and the results of browning inhibition obtained, are shown in Table I below.

Apple samples were obtained from local food stores and stored briefly under refrigeration at 3° C. until use. About one hour prior to use, the apple samples were removed from refrigeration and equilibrated at room temperature at about 20° C. The apples were rinsed with water, sectioned with a household apple slicer, and juiced with an Acme Supreme Model 6001 Juicerator lined with Whatman No. 1 filter paper. Juice was collected in a beaker containing ascorbic acid (5 mg/100 mL juice) and kept stirred until decanted. The ascorbic acid was used to prevent instantaneous browning by providing a short lag time to allow test materials to be completely solubilized. The amount of ascorbic acid used was not enough to prevent browning alone for more than 1 h. Aliquots (50 mL) of juice were poured into beakers containing test material and stirred. Aggregates in juice were mechanically dispersed with a spatula. After approximately 1 min., the mixtures were poured into optical cells for reflectance measurements at room temperature (Ca 20° C.). For long term juice experiments, 25-mL aliquots of juice were mixed with test materials, kept in closed vials at 3° C., and removed periodically for reflectance measurements. Juice pH was measured with an Orion model 611 pH meter and typically ranged from 3.2 to 3.5. Amylose sulfate and larch xylan sulfate were purchased from V-Labs, Covington, La. The larch xylan sulfate was molecular weight fraction II of the synthetic batch. Carrageenans were purchased from Sigma Chemical Company. Food grade sodium hexametaphosphate (SHMP) was provided by the FMC Corporation, Philadelphia, Pa. Other chemicals used were reagent grade.

Browning Measurements. Changes in pigmentation were followed with a Byk-Gardner Color Machine spectrophotometer system (Pacific Scientific, Silver Spring, Md.) according to the procedure described by Sapers and Douglas in "Measurement of Enzymatic Browning of Cut Surfaces and in Juice of Raw Apple and Pear Fruits"; *Journal of Food Science*, 52; page 1258; 1987, and incorporated herein by reference. Reflectance (R) at 440 nm was recorded at specific intervals. For these measurements, samples were illuminated at 45° and the reflected light at 0° was collected and detected. Specular reflectance was not collected. Samples were kept at 25° C. throughout the measurement period, for up to 24 hours. Reflectance$_{440}$ values were used to calculate percent inhibition of browning, in the following way:

$$\% \text{ Inhibition} = \frac{\Delta R \text{ control} - \Delta R \text{ sample}}{\Delta R \text{ control}} \times 100$$

That is, the change ($\Delta$) in reflectance (R) for the untreated control minus the change in reflectance for the treated sample, divided by the change in reflectance for the untreated control, times 100.

Two or three replicates of each treatment were used per experiment. Each experiment was done at least twice. A percent inhibition value of 100 indicates complete inhibition of browning while a value of 0 indicates no inhibition.

Inhibition of Browning of fresh, raw 'Granny Smith' apple juice by sulfated polysaccharides, with or without the addition of 0.5% citric acid or 0.5% sodium hexametaphosphate (SHMP) at room temperature. Data are listed as % inhibition of browning as measured by reflectance at 440 nm (mean±standard error of 6 or more samples), 24 hours after the start of treatment (unless otherwise noted). For the sake of comparison two tests were conducted using only 0.5% citric acid and 0.5% SHMP. The percent inhibition achieved with the citric acid was 34.1±4.1, and that achieved with the SHMP was 1.34±1.5.

TABLE 1

| | % inhibition by: | | |
|---|---|---|---|
| Type and % of polysaccharide | polysaccharide alone | polysaccharide + 0.5% Citric Acid | polysaccharide + 0.5% SHMP |
| Iota-carrageenan | | | |
| 0.05% | 14.0 ± 3.6[a] | 95.2 ± 7.8 | 20.7 ± 10.2[a] |
| 0.1% | 40.3 ± 11.9 | 100 | 93.6 ± 8.7 |
| 0.25% | 100 | 100 | 100 |
| Kappa-carrageenan | | | |
| 0.05% | 34.4 ± 3.4[a] | 95.7 ± 2.4 | 39.1 ± 16.2[a] |
| 0.1% | 53.4 ± 9.7 | 97.7 ± 4.4 | 84.7 ± 3.0 |
| 0.25% | 91.3 ± 12.7 | 98.9 ± 2.2 | 95.2 ± 7.0 |
| Lambda-carrageenan | | | |
| 0.05% | 28.9 ± 2.4 | 100 | 33.5 ± 7.5 |
| 0.1% | 24.5 ± 7.5 | 87.0 ± 4.5 | 93.1 ± 4.7 |
| 0.25% | 88.0 ± 2.9 | 100 | 88.7 ± 3.8 |
| Amylose sulfate | | | |
| 0.025% | 9.0 ± 9.8[a] | 94.7 ± 6.3 | 0[a] |
| 0.25% | 27.0 ± 12.1 | 98.1 ± 4.7 | 23.7 ± 10.4 |
| Xylan sulfate | | | |
| 0.025% | 11.7 ± 12.4[a] | 91.5 ± 4.5 | 0.4 ± 0.8[a] |
| 0.25% | 2.3 ± 3.8 | 88.6 ± 6.5 | 55.7 ± 30.5 |

[a]Data recorded 2 hours after treatment.

The data of the above table evidences the effectiveness of sulfated polysaccharides for inhibiting enzymatic browning of apple juice. For example, at a concentration level of at least 0.25%, all of the carrageenans tested were very effective for inhibiting browning of apple juice when used alone. The use of a promoter, such as citric acid, enhanced the effectiveness of the polysaccharide. The data also show that the use of citric acid, as the promoter, enabled the carrageenans to reach almost total effectiveness for inhibiting browning. Further, the use of the promoter allows one to use less sulfated polysaccharide and still maintain substantially total effectiveness against browning. For example, at 0.05%, lambda-carrageenan exhibited only 28.9% inhibition against browning versus 100% inhibition when the same amount is used with 0.5% citric acid. Also table 1, provides unequivocal evidence of a surprising, unexpected and desirous synergism between the sulfated polysaccharide and the promoter. For example, 0.5% citric acid alone provided 34.1±4.1% inhibition, and 0.05% iota-carrageenan provided 14.0±3.6% inhibition. One would expect to obtain from a combination of 0.5% citric acid and 0.05% iota-carrageenan, at best, the sum of these two individual effects i.e. 34.1±4.1+14.0±3.6=48.1±7.7. Surprisingly, the resultant browning inhibition was 95.2+7.8%, almost twice the best expected result. It is noted that Table 1 includes many other equally as surprising synergistic results.

The data also show that some sulfated polysaccharides, such as amylose sulfate and xylan sulfate, at concentration levels up to 0.25%, are effective for inhibiting browning of apple juice, only in the presence of a promoter, such as citric acid. The combination of only 0.025% amylose sulfate or xylan sulfate with 0.5% citric acid inhibited browning 91.5–95%. This was also a synergistic effect, as 0.025% amylose sulfate or xylan sulfate alone were poor inhibitors of browning (Table 1).

Browning was also inhibited approximately 90–100% with the combination of 0.1% iota-, kappa-, or lambda-carrageenan and 0.5% sodium hexametaphosphate (SHMP). Alone, 0.5% SHMP did not inhibit browning, indicating that its combination with carrageenan also produces a synergistic effect (Table 1). It is believed that at higher concentrations, these sulfated polysaccharides would also be effective for inhibiting browning, without the use of a promoter.

EXAMPLE 2

Four Granny Smith apple juice samples were prepared such that three of the samples contained 0.5% ascorbic acid and the fourth contained 0.5% citric acid. Each of the ascorbic acid-containing samples contained 0.5% of a different carrageenan-lambda, kappa, or iota. The citric acid-containing sample contained 0.5% iota carrageenan. After 24 hours at room temperature (about 23° C.) all the samples were visually identical and all showed complete lack of browning. Hence, under these circumstances, ascorbic acid plus carrageenan was as effective as citric acid and carrageenan. Erythorbic acid, an inexpensive isomer of ascorbic acid, has essentially the same chemical properties as ascorbic acid and therefore, could be used with similar effects in place of ascorbic acid.

EXAMPLE 3

Figure 2:
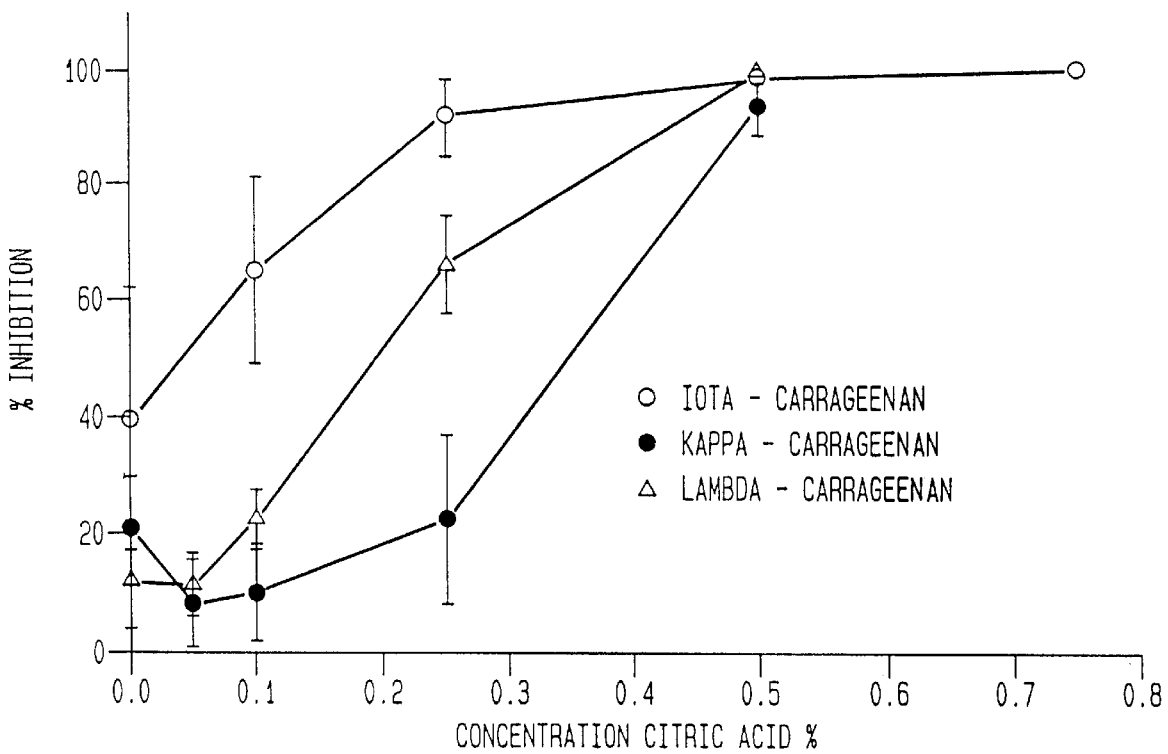
FIG. 2 is a graph of percent inhibition vs. concentration of citric acid, showing dose response curves for citric acid in the presence of 0.05% iota-, kappa-, and lambda-carrageenan, as described in Example 3.

To determine if possible chelators of copper in polyphenol oxidase could be used to prevent apple juice browning in combination with carrageenan, and if therefore lower concentrations of carrageenan could be used, citric acid was tested in combination with the carrageenans. The procedures set forth in example 1 were utilized to determine: (1) the degree of browning inhibition (% inhibition) provided by combinations of 0.5% citric acid with various concentrations of one of iota, kappa or lambda carrageenan, and; (2) the degree of browning inhibition (% inhibition) provided by combinations of 0.5% of iota, kappa or lambda carrageenan with various concentrations of citric acid. The results are shown in FIGS. 1 and 2, respectively. Browning was inhibited 95–100% by the combination of 0.05% of any of the carrageenans and 0.5% citric acid. Addition of 0.5% citric acid decreased juice pH approximately 0.2 units, to 3.0–3.3. Inhibition by 0.5% citric acid alone was approximately 35%, indicating that decrease of pH alone was not sufficient to inhibit browning. Inhibition by 0.05% of any of the carrageenans alone was less than about 40%, demonstrating that the combination of the carrageenan and citric acid resulted in a synergistic effect. Concentrations of iota- or kappa-carrageenan less than 0.05% in combination with 0.5% citric acid were less effective in preventing browning. However, even 0.025% lambda-carrageenan combined with 0.5% citric acid inhibited browning approximately 100%. Decreasing the concentration of citric acid to less than 0.5% decreased the % inhibition, when used in combination with 0.05% of any of the carrageenans. This effect was most pronounced with kappa-carrageenan (FIG. 2).

EXAMPLE 4

The purpose of this example is to show the effectiveness of certain compositions of the present invention to provide long term inhibition of browning. The color of unpasteurized juice containing 0.1% iota-carrageenan, 0.5% citric acid, and 0.1% sodium benzoate (as a preservative) remained unchanged (FIG. 3) for at least 3 months at 3° C. Similar results were produced using kappa- or lambda-carrageenan instead of iota-carrageenan. No other juice treatment tried prevented browning for more than 3 days. For example, the combination of iota-carrageenan and SHMP was ineffective at preventing browning over long term storage (FIG. 3). After 3 or 4 months the carrageenan/citric acid/sodium benzoate treated juice darkened slightly (data not shown), suggesting that nonenzymatic browning may have occurred.

EXAMPLE 5 (Comparative Example)

Three samples for each of the following gums were prepared: acacia, guar, mastic, guaic, cellulose, karaya, and tragacanth. One contained 0.5% of the gum; a second 0.5% of the gum with 0.5% SHMP; and a third 0.5% of the gum with 0.5% citric acid. After 24 hours, all of the samples showed signs of browning. Thus, even with use of citric acid, the most effective promoter for the sulfated polysaccharides of the present invention, the above mentioned gums were not effective for inhibiting the browning of apple juice. These gums are taught as being effective for the inhibition of browning of fresh fruit and vegetable products when used with citric acid in U.S. Pat. No. 4,959,230. This further evidences that it cannot be predicted that merely because a particular chemical agent is effective for inhibiting browning of fresh fruit and vegetables, that it will be effective for inhibiting browning of raw fruit juice and vegetable juice.

The foregoing detailed descriptions and examples are given merely for purposes of illustration. Modifications and variations may be made therein without departing from the spirit and scope of the invention.

What is claimed is:

1. A composition useful for inhibiting enzymatic browning of raw juice selected from the group consisting of raw fruit juice, raw vegetable juice and mixtures thereof, which composition consists essentially of (a) at least one sulfated polysaccharide in an amount sufficient to inhibit enzymatic browning; and (b) a promoter selected from the group consisting of chelating agents, acidulants, and mixtures thereof in an amount sufficient to enhance the browning inhibiting effect of said polysaccharide; wherein said polysaccharide is from about 0.025 percent weight:volume to about 1.0 percent weight:volume and said promoter is from about 0.25 percent weight:volume to about 1 percent weight:volume.

2. The composition of claim 1 which is an aqueous concentrate.

3. A raw juice selected from the group consisting of raw fruit juice, raw vegetable juice, and mixtures thereof, subject to enzymatic browning, containing at least one sulfated polysaccharide in an amount effective to inhibit browning of said juice.

4. The raw juice of claim 3 wherein said at least one sulfated polysaccharide is selected from the group consisting of carrageenans, amylose sulfate, xylan sulfate, and mixtures thereof; in a concentration of from about 0.1% weight:volume to about 5% weight:volume.

5. The raw juice of claim 4 wherein said at least one sulfated polysaccharide is at least one carrageenan present in a concentration of from about 0.25% weight:volume to about 1% weight:volume.

6. The raw juice of claim 5 wherein said at least one carrageenan is selected from the group consisting of lambda-carrageenan, kappa-carrageenan, iota-carrageenan, and mixtures thereof.

7. The raw juice of claim 6 further including at least one chelating agent in an amount effective to enhance the browning inhibiting effect of said at least one carrageenan.

8. The raw juice of claim 7 which also includes at least one acidulant in an amount effective to enhance the browning inhibiting effect of said at least one carrageenan.

9. The raw juice of claim 3 further including at least one chelating agent in an amount effective to enhance the browning inhibiting effect of said at least one sulfated polysaccharide.

10. The raw juice of claim 9 which also includes at least one acidulant in an amount effective to enhance the browning inhibiting effect of said at least one sulfated polysaccharide.

11. The raw juice of claim 3 further including at least one acidulant in an amount effective to enhance the browning inhibiting effect of said at least one sulfated polysaccharide.

12. A raw juice selected from the group consisting of raw fruit juice, raw vegetable juice, and mixtures thereof, subject to enzymatic browning, containing a raw juice selected from the group consisting of apple juice, grape juice, and mixtures thereof;

from about 0.025% weight:volume to about 1% weight:volume of at least one carrageenan selected from the group consisting of lambda-carrageenan, iota-carrageenan, kappa-carrageenan, and mixtures thereof;

from about 0.25% weight:volume to about 1% weight:volume of at least one chelating agent; and from about 0.1% weight:volume to about 1% weight:volume of at least one acidulant.

* * * * *